United States Patent
Carter et al.

(10) Patent No.: US 9,501,659 B2
(45) Date of Patent: Nov. 22, 2016

(54) INHERITING SOCIAL NETWORK INFORMATION

(71) Applicant: International Business Machines Corporation, Armonk, NY (US)

(72) Inventors: Bernadette A. Carter, Raleigh, NC (US); Arthur R. Francis, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 770 days.

(21) Appl. No.: 13/898,043

(22) Filed: May 20, 2013

(65) Prior Publication Data

US 2014/0344887 A1    Nov. 20, 2014

(51) Int. Cl.
    *G06F 21/62* (2013.01)
(52) U.S. Cl.
    CPC .................... *G06F 21/6245* (2013.01)
(58) Field of Classification Search
    CPC .................................... G06F 21/6245
    USPC ........................................... 709/203
    See application file for complete search history.

(56) References Cited

U.S. PATENT DOCUMENTS

| | | | |
|---|---|---|---|
| 7,853,881 B1* | 12/2010 | Aly Assal | 715/734 |
| 8,234,300 B2 | 7/2012 | Muller et al. | |
| 2009/0030985 A1 | 1/2009 | Yuan | |
| 2010/0037288 A1* | 2/2010 | Carraher | G06F 21/31 726/1 |
| 2012/0110642 A1 | 5/2012 | Grassel et al. | |
| 2012/0143917 A1 | 6/2012 | Prabaker et al. | |
| 2013/0212115 A1* | 8/2013 | Yerli | G06F 17/30268 707/749 |
| 2013/0253991 A1* | 9/2013 | Barhate | G06Q 10/00 705/7.36 |
| 2013/0325976 A1* | 12/2013 | Mansfield | G06Q 50/01 709/206 |

OTHER PUBLICATIONS http://www-03.ibm.com/software/products/us/en/conn, "IBM Connections" printed Apr. 29, 2013.

* cited by examiner

*Primary Examiner* — Arvin Eskandarnia
(74) *Attorney, Agent, or Firm* — Scully, Scott, Murphy & Presser, P.C.; Daniel R. Simek

(57) ABSTRACT

Various embodiments provide for inheriting social network information from a first user to one or more other users. In various examples, rule-based criteria (e.g., origination, update frequency, access, event occurrence and/or proficiency) are utilized for allowing a first user to bestow (e.g., transfer/share/delegate) social network information (e.g., authorization, access, contact(s), document(s), video(s), file(s), image(s), post(s), blog(s), content, rule(s) and/or control) to a second user.

20 Claims, 4 Drawing Sheets

INHERITING SOCIAL NETWORK INFORMATION

BACKGROUND

The present disclosure relates generally to the field of inheriting social network information.

More and more people are joining social networks. Many of these new members will find that even prior to officially joining a given social network, parts of their digital profile (e.g., photographs, videos, text information) precedes them. For example, if a person's parents and/or grandparents were early adopters of the social network, there will typically already be a vast set of content that will define the person's digital profile before the person officially joins the social network.

SUMMARY

In various embodiments, methodologies may be provided that automatically enable a user to inherit social network information.

In one embodiment, a method for enabling the inheritance of social network information from a first social networking contact to a second social networking contact is provided, the method comprising: receiving, by a processor, an identification of the first social networking contact; obtaining, by the processor, an identification of the social network information; receiving, by the processor, at least one criterion defining a condition under which the second social networking contact is to be enabled to inherit the social network information; determining, by the processor, that the at least one criterion has been met; and notifying the second social networking contact by the processor, based upon the determination that the at least one criterion has been met and after an identification of the second social networking contact has been made, that the second social networking contact is eligible to inherit the social network information.

In another embodiment, a computer readable storage medium, tangibly embodying a program of instructions executable by the computer for enabling the inheritance of social network information from a first social networking contact to a second social networking contact is provided, the program of instructions, when executing, performing the following steps: receiving an identification of the first social networking contact; obtaining an identification of the social network information; receiving at least one criterion defining a condition under which the second social networking contact is to be enabled to inherit the social network information; determining that the at least one criterion has been met; and notifying the second social networking contact by the processor, based upon the determination that the at least one criterion has been met and after an identification of the second social networking contact has been made, that the second social networking contact is eligible to inherit the social network information.

In another embodiment, computer-implemented system for enabling the inheritance of social network information from a first social networking contact to a second social networking contact is provided, the system comprising: a first receiving element configured to receive an identification of the first social networking contact; an obtaining element configured to obtain an identification of the social network information; a second receiving element configured to receive at least one criterion defining a condition under which the second social networking contact is to be enabled to inherit the social network information; a determining element configured to determine that the at least one criterion has been met; and a notifying element configured to notify the second social networking contact, based upon the determination that the at least one criterion has been met and after an identification of the second social networking contact has been made, that the second social networking contact is eligible to inherit the social network information.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
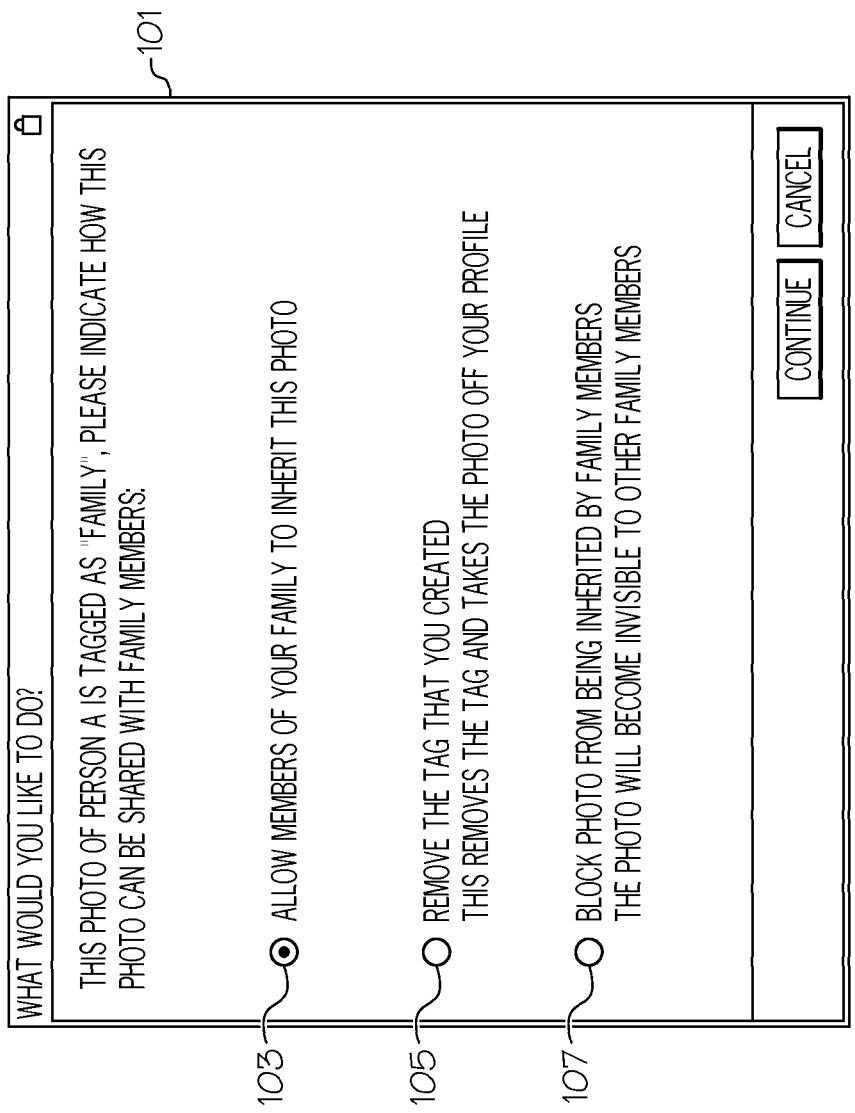
FIG. 1 depicts an example user interface according to an embodiment of the present invention.

As described herein, mechanisms are provided for enabling inheriting social network information (e.g., one or more social network profiles, social network content) comprising: utilizing criteria for allowing a first user to bestow (e.g., transfer, share, delegate) the social network information to a second user.

In one example, the social network information is selected from a group including (but not limited to): authorization, access, contact(s), document(s), video(s), picture(s), file(s), post(s), blog(s), content, rule(s) and/or control.

In another example, the second user is selected from a group including (but not limited to): a business associate, a family member, a manager, a delegate, a protégé and/or a colleague.

In another example, the criteria is rule-based. In one specific example, the rule-based criteria considers information selected from a group including (but not limited to): origination (e.g., by whom, when), update frequency (e.g., by whom, when), exhibited proficiency (e.g., by whom, when), perceived proficiency (e.g., by whom, when), access (e.g., by whom, when), internal event occurrence and/or external event occurrence.

As used herein, "internal events" are events that happen in a specific social network system and "external events" are events that happen outside of the specific social network system. One example of an external event is that a user has a patent granted and it is reflected on the USPTO website (therefore, for example, enable inheritance of content after patent proficiency is displayed). Another example of an external event is that person "x" has moved to a different job/role (therefore, for example, use inheritance to move content to people who fit user x's old role's competencies). One example of an internal event is that "n" number of people have stated that a given user has "y" competency (therefore, for example, enable inheritance once such y competency is met).

As described herein, with the existence of a pool of information that predates a potential new member joining a social network, the option of inheriting pre-existing information that relates to the potential new member's ancestral members (e.g., parents, grandparents, siblings and/or extended family) provides a mechanism to quickly and accurately manage the creation of the potential new member's social identity.

As described herein, mechanisms are provided to a member of a social network to associate potential family members with an appropriate level of content that could be inherited. To enable this new function, existing members (e.g., parents and/or extended family) may be provided a mechanism to enable voluntary sharing of a certain set or subset of their social network information to potential family members, both known and unknown.

For example, a current member might not know the names of future generations of their family, but has created a vast library of photos/videos/documents etc. that they find valuable for future generations. By providing an option that is tied to a parent's account for sharing of a parent's social network information, a richer social experience for present and/or future social generations is made available.

From the parents' perspective, they are, in this example, the owners of their content, and could control the movement of a subset of their content to the child's account. From the child's perspective, they are, in this example, also in control of the content that is inherited into their account (in various specific examples, mechanisms may be in place to accept content and references that are shared by the parents, with the ability to untag or unlink any potentially embarrassing or questionable content/references). In another example, a "parent" can inherit social network information from a "child".

As described herein, various mechanisms are provided to enable various levels of inheritance that may take place after certain events have "triggered" the inheritance mechanism. The levels may range, for example, from the content remaining on the originator's account and access being granted to "heirs" to the ownership of the content being completely transferred to the "heirs" with the originator retaining a reference (in one specific example, the latter inheritance mechanism may also have reference retention as an optional mechanism and such reference may be susceptible to removal as desired). In another specific example, the triggers to invoke inheritance may be set by the owner of the content and/or any delegates the owner may set.

For the purposes of describing and claiming the present invention the term "social network" is intended to refer to a grouping of people according to one or more relationships between and/or among them. In one example, a social network may include a plurality of members and may be organized and maintained via a computer system.

For the purposes of describing and claiming the present invention the term "social networking contacts" is intended to refer to two or more people in a social network who are related in some manner. In various examples, such relationships may be as family, as friends, as work colleagues, as associates, as "a friend of a friend", as graduates of the same school and/or any other desired feature or characteristic.

For the purposes of describing and claiming the present invention the term "social network profile" is intended to refer to authorization, access, rule(s) and/or control associated with a social network member's participation in the social network.

For the purposes of describing and claiming the present invention the term "social network content" is intended to refer to contact(s), document(s), video(s), picture(s), file(s), post(s), blog(s), and/or any other data associated with a social network member's participation in the social network.

For the purposes of describing and claiming the present invention the term "ancestral social network information" is intended to refer to information of a first member of a social network that relates to a family member related to the first member of the social network. In one example, such ancestral social network information may be inherited from a parent. In another example, such ancestral social network information may be inherited from a grandparent. In another example, such ancestral social network information may be inherited from a sibling. In another example, such ancestral social network information may be inherited from an aunt or uncle. In another example, such ancestral social network information may be inherited from an extended family member.

As described herein, mechanisms are provided for enabling inheritance of information (e.g., ancestral information) from a user's account by providing the appropriate functionality for indication and authorization of content deemed sharable (e.g., by family members) on a social network system. As seen in FIG. 1, various examples enhance the conventional profile function by providing a mechanism where users can define and group family members and authorize sharing of all or a subset of their social network content.

More particularly, FIG. 1 shows an example user interface 101 according to an embodiment of the present invention is shown. As seen in this FIG. 1, a user may be presented with: (a) a radio button 103 to allow members of the user's family to inherit a particular photo; (b) a radio button 105 to remove a tag associated with a particular photo and take the photo off of the user's profile; and (c) a radio button 107 to block the photo from being inherited by the user's family members and make the photo invisible to the user's family members.

Figure 2:
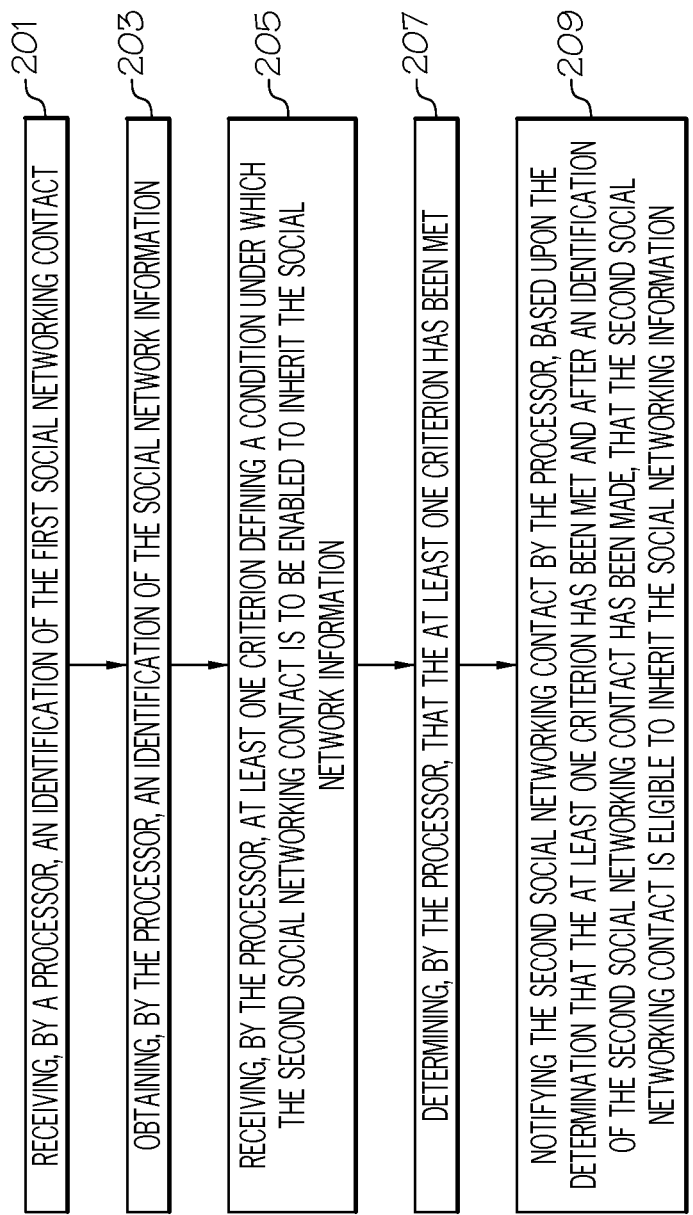
FIG. 2 depicts a flowchart of a method according to an embodiment of the present invention.

Referring now to FIG. 2, a method for enabling the inheritance of social network information from a first social networking contact to a second social networking contact is shown. As seen in this FIG. 2, the method of this embodiment comprises: at 201—receiving, by a processor, an identification of the first social networking contact; at 203—obtaining, by the processor, an identification of the social network information; at 205—receiving, by the processor, at least one criterion defining a condition under which the second social networking contact is to be enabled to inherit the social network information; at 207—determining, by the processor, that the at least one criterion has been met; and at 209—notifying the second social networking contact by the processor, based upon the determination that the at least one criterion has been met and after an identification of the second social networking contact has been made, that the second social networking contact is eligible to inherit the social network information.

In one example, any steps may be carried out in the order recited or the steps may be carried out in another order.

In another example, the obtaining, by the processor, the identification of the social network information may comprise receiving, by the processor, the identification of the social network information (e.g., received from the first social networking contact).

In another example, the obtaining, by the processor, the identification of the social network information may comprise determining, by the processor, the identification of the social network information.

In another example, the social network information comprises: (a) one or more social network profiles; (b) social network content; or (c) any combination thereof.

In another example, the one or more social network profiles comprises: (a) one or more authorizations; (b) one or more access rights; (c) one or more rules; (d) one or more control rights; or (e) any combination thereof.

In another example, the social network content comprises: (a) one or more contacts; (b) one or more documents; (c) one or more videos; (d) one or more pictures; (e) one or more files; (f) one or more posts; (g) one or more blogs; or (h) any combination thereof.

In another example, the at least one criterion comprises: received one or more recommendations inside of the social network; received one or more recommendations outside of the social network; received one of more positive responses inside of the social network; received one of more positive responses outside of the social network; reached a certain level inside of the social network (e.g., won an award, attained a level of proficiency, grew network to include x, y, z people); reached a certain level outside of the social network (e.g., won an award, attained a level of proficiency); reached a certain age; one or more certain events have happened; a specific date has passed; a user acquires certain associations or joins a specific team or club.

In another example, the method further comprises receiving by the processor an identification of the second social networking contact.

In another example, one or more of the steps (e.g., steps 201, 203, 205) may be performed before the second social networking contact is identified and notified (e.g., notified via an electronic communication).

In another example, the second social networking contact comprises: (a) a business associate of the first social networking contact; (b) a family member related to the first social networking contact; (c) a manager of the first social networking contact; (d) a delegate of first social networking contact; (e) a protégé of first social networking contact; (f) a colleague of first social networking contact; or (g) any combination thereof.

In another example, the inheritance comprises: (a) sharing the social network information between the first social networking contact and the second social networking contact; (b) delegating the social network information from the first social networking contact to the second social networking contact; (c) transferring the social network information from the first social networking contact to the second social networking contact; or (d) any combination thereof.

Figure 3:
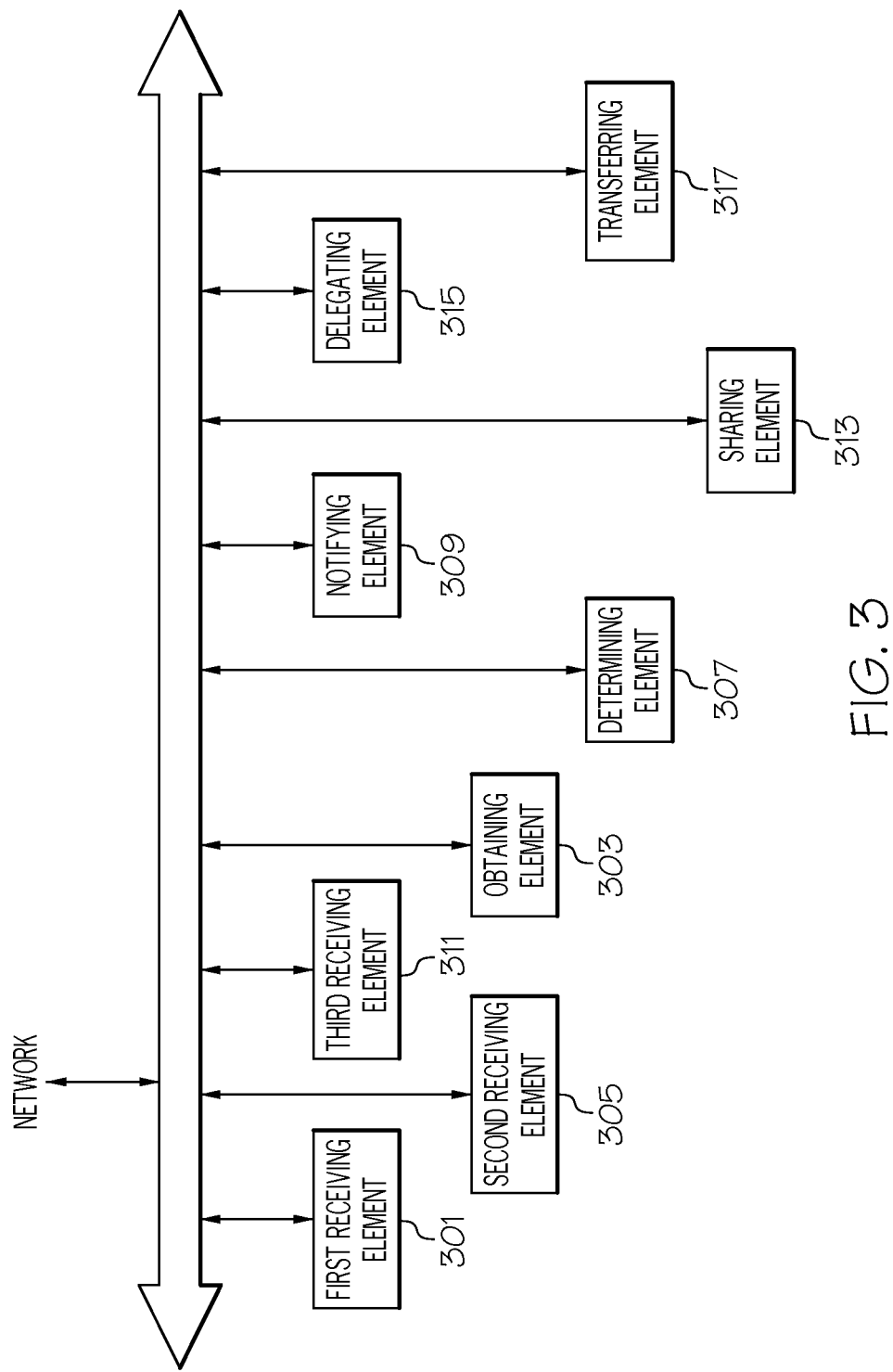
FIG. 3 depicts a block diagram of a system according to an embodiment of the present invention.

Referring now to FIG. 3, in another embodiment, a system 300 for enabling the inheritance of social network information from a first social networking contact to a second social networking contact is provided. This system may include the following elements: a first receiving element 301 configured to receive an identification of the first social networking contact; an obtaining element 303 configured to obtain an identification of the social network information; a second receiving element 305 configured to receive at least one criterion defining a condition under which the second social networking contact is to be enabled to inherit the social network information; a determining element 307 configured to determine that the at least one criterion has been met; and a notifying element 309 configured to notify the second social networking contact, based upon the determination that the at least one criterion has been met and after an identification of the second social networking contact has been made, that the second social networking contact is eligible to inherit the social network information.

Still referring to FIG. 3, the system 300 may further comprise: a third receiving element 311 configured to receive an identification of the second social networking contact; a sharing element 313 configured to share the social network information between the first social networking contact and the second social networking contact; a delegating element 315 configured to delegate the social network information from the first social networking contact to the second social networking contact; and a transferring element 317 configured to transfer the social network information from the first social networking contact to the second social networking contact.

Still referring to FIG. 3, in one example, the obtaining element may obtain the identification of the social network information by receiving the identification of the social network information (e.g., received from the first social networking contact). In another example, the obtaining element may obtain the identification of the social network information by determining the identification of the social network information.

Still referring to FIG. 3, each of the elements may be operatively connected together via system bus 302. In one example, communication between and among the various elements may be bi-directional. In another example, the communication may be carried out via the Internet, an intranet, a local area network, a wide area network and/or any other desired communication channel(s). In another example, some or all of these elements may be implemented in a computer system of the type shown in FIG. 4.

Figure 4:
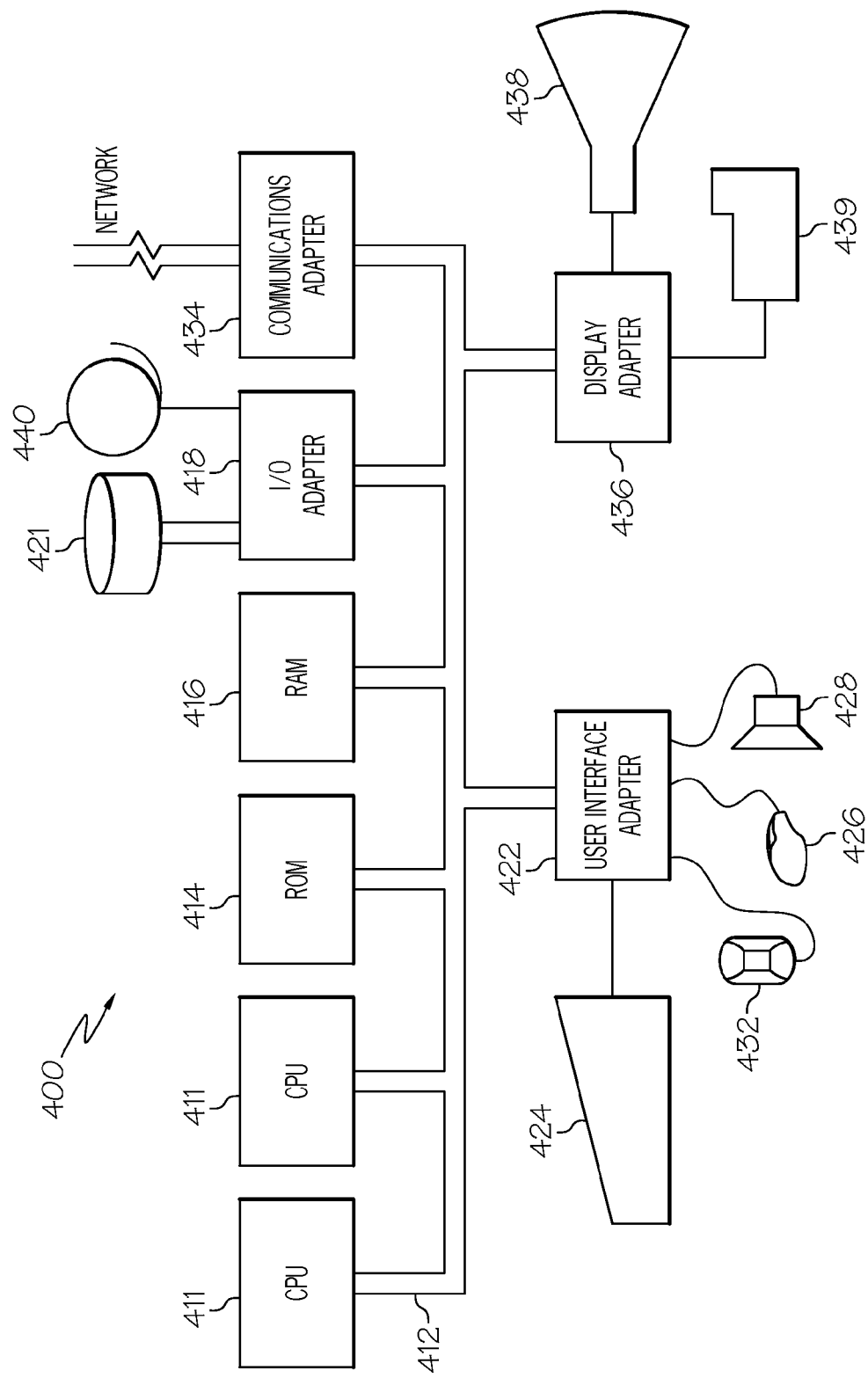
FIG. 4 depicts a block diagram of a system according to an embodiment of the present invention.

Referring now to FIG. 4, this figure shows a hardware configuration of computing system 400 according to an embodiment of the present invention. As seen, this hardware configuration has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communications adapter 434 for connecting the system 400 to a data processing network, the Internet, an intranet, a local area network (LAN), etc., and a display adapter 436 for connecting the bus 412 to a display device 438 and/or printer 439 (e.g., a digital printer or the like).

Of note, while various figures may show various entities communicating, it is to be understood that the figures are actually referring to communication by computer system(s) or the like that are owned, leased, operated, used by, in the possession of, and/or controlled by each of the entities.

In one embodiment, a method for enabling the inheritance of social network information from a first social networking contact to a second social networking contact is provided, the method comprising: receiving, by a processor, an identification of the first social networking contact; obtaining, by the processor, an identification of the social network information; receiving, by the processor, at least one criterion defining a condition under which the second social networking contact is to be enabled to inherit the social network information; determining, by the processor, that the at least one criterion has been met; and notifying the second social networking contact by the processor, based upon the determination that the at least one criterion has been met and after an identification of the second social networking contact has been made, that the second social networking contact is eligible to inherit the social network information.

In one example, the social network information comprises: (a) one or more social network profiles; (b) social network content; or (c) any combination thereof.

In another example, the one or more social network profiles comprises: (a) one or more authorizations; (b) one or more access rights; (c) one or more rules; (d) one or more control rights; or (e) any combination thereof.

In another example, the social network content comprises: (a) one or more contacts; (b) one or more documents; (c) one or more videos; (d) one or more pictures; (e) one or more files; (f) one or more posts; (g) one or more blogs; or (h) any combination thereof.

In another example, the at least one criterion comprises: (a) the second social networking contact received one or more recommendations inside of the social network; (b) the second social networking contact received one or more recommendations outside of the social network; (c) the second social networking contact received one of more positive responses inside of the social network; (d) the second social networking contact received one of more positive responses outside of the social network; (e) the second social networking contact reached a certain level inside of the social network; (f) the second social networking contact reached a certain level outside of the social network; (g) the second social networking contact reached a certain age; (h) one or more certain events have happened; (i) a specific date has passed; (j) the second social networking contact acquires one or more certain associations; (k) the second social networking contact joins a specific team or club; or (l) any combination of thereof.

In another example, the method further comprises receiving by the processor an identification of the second social networking contact.

In another example, the second social networking contact comprises: (a) a business associate of the first social networking contact; (b) a family member related to the first social networking contact; (c) a manager of the first social networking contact; (d) a delegate of first social networking contact; (e) a protégé of first social networking contact; (f) a colleague of first social networking contact; (g) a person matching one or more specified characteristics; or (h) any combination thereof.

In another example, the inheritance comprises: (a) sharing the social network information between the first social networking contact and the second social networking contact; (b) delegating the social network information from the first social networking contact to the second social networking contact; (c) transferring the social network information from the first social networking contact to the second social networking contact; or (d) any combination thereof.

In another embodiment, a computer readable storage medium, tangibly embodying a program of instructions executable by the computer for enabling the inheritance of social network information from a first social networking contact to a second social networking contact is provided, the program of instructions, when executing, performing the following steps: receiving an identification of the first social networking contact; obtaining an identification of the social network information; receiving at least one criterion defining a condition under which the second social networking contact is to be enabled to inherit the social network information; determining that the at least one criterion has been met; and notifying the second social networking contact by the processor, based upon the determination that the at least one criterion has been met and after an identification of the second social networking contact has been made, that the second social networking contact is eligible to inherit the social network information.

In one example, the social network information comprises: (a) one or more social network profiles; (b) social network content; or (c) any combination thereof.

In another example, the one or more social network profiles comprises: (a) one or more authorizations; (b) one or more access rights; (c) one or more rules; (d) one or more control rights; or (e) any combination thereof.

In another example, the social network content comprises: (a) one or more contacts; (b) one or more documents; (c) one or more videos; (d) one or more pictures; (e) one or more files; (f) one or more posts; (g) one or more blogs; or (h) any combination thereof.

In another example, the at least one criterion comprises: (a) the second social networking contact received one or more recommendations inside of the social network; (b) the second social networking contact received one or more recommendations outside of the social network; (c) the second social networking contact received one of more positive responses inside of the social network; (d) the second social networking contact received one of more positive responses outside of the social network; (e) the second social networking contact reached a certain level inside of the social network; (f) the second social networking contact reached a certain level outside of the social network; (g) the second social networking contact reached a certain age; (h) one or more certain events have happened; (i) a specific date has passed; (j) the second social networking contact acquires one or more certain associations; (k) the second social networking contact joins a specific team or club; or (l) any combination of thereof.

In another example, the program of instructions, when executing, further performs receiving an identification of the second social networking contact.

In another example, the second social networking contact comprises: (a) a business associate of the first social networking contact; (b) a family member related to the first social networking contact; (c) a manager of the first social networking contact; (d) a delegate of first social networking contact; (e) a protégé of first social networking contact; (f) a colleague of first social networking contact; (g) a person matching one or more specified characteristics; or (h) any combination thereof.

In another example, the inheritance comprises: (a) sharing the social network information between the first social networking contact and the second social networking contact; (b) delegating the social network information from the first social networking contact to the second social networking contact; (c) transferring the social network information from the first social networking contact to the second social networking contact; or (d) any combination thereof.

In another embodiment, computer-implemented system for enabling the inheritance of social network information from a first social networking contact to a second social networking contact is provided, the system comprising: a first receiving element configured to receive an identification of the first social networking contact; an obtaining element configured to obtain an identification of the social network information; a second receiving element configured to receive at least one criterion defining a condition under which the second social networking contact is to be enabled to inherit the social network information; a determining element configured to determine that the at least one criterion has been met; and a notifying element configured to notify the second social networking contact, based upon the determination that the at least one criterion has been met and after an identification of the second social networking contact has been made, that the second social networking contact is eligible to inherit the social network information.

In one example, the social network information comprises: (a) one or more social network profiles; (b) social network content; or (c) any combination thereof.

In another example, the one or more social network profiles comprises: (a) one or more authorizations; (b) one or more access rights; (c) one or more rules; (d) one or more control rights; or (e) any combination thereof.

In another example, the social network content comprises: (a) one or more contacts; (b) one or more documents; (c) one or more videos; (d) one or more pictures; (e) one or more files; (f) one or more posts; (g) one or more blogs; or (h) any combination thereof.

In other examples, any steps described herein may be carried out in any appropriate desired order.

As described herein, various mechanisms provide an enhanced experience by going beyond only access (e.g., to content) and instead providing a method of content inheritance or complete transfer (ownership change) of an asset (e.g., content).

In other examples, by utilizing one or more trigger mechanisms, users are enabled to receive access (e.g., to content) and/or ownership of an asset (e.g., content) without having to make a request (or even without having prior knowledge of the asset). In one specific example, mechanisms are provided to monitor the criteria specified by a content owner and notify an inheriting person(s) and/or grant access to an inheriting person(s) and/or ownership to an inheriting person(s) when such an inheriting person(s) are eligible.

In other examples, external source(s) outside of the social network may be leveraged (e.g. accessed) in order to check criteria and determine if a potential inheriting person (e.g., social profile recipient, content recipient) should even be made aware of the social profile/content.

In other examples, a state in one or more external systems may be leveraged (e.g. accessed) in order to determine content access rules/eligibility. In one example, proficiency or maturity level based on meeting specific criteria may be used. In a specific example, only release access or ownership to a patent specific social network asset once it has been determined that the user has been granted "n" number of patents in a specific area (e.g., based on continuously querying the USPTO service over time).

In other examples, the inheritance (e.g., via an inheritance model) of pre-existing social content by potential family members and/or colleagues is provided (in one specific example, mechanisms are provided for defining an inheritance permission model and enabling a complete ownership transfer based on criteria that may be met and/or checked inside and/or outside of the social network).

In another example, the mechanisms described herein may be applicable to all social network content.

In other examples, various embodiments may be applied in the context of: (a) social computing, collaboration and communications; (b) social business framework; and/or (c) creating/managing social network profile privacy information.

In other embodiments, various mechanisms may be applied in the context of business social software. For example, in such business social software used for social network style communication, users may create status posts (wherein referencing other people in the status post may be permitted), upload documents, create wiki pages, blogs etc. Various embodiments may be used over time to transition the ownership of content to another person (or people) who is identified and/or have met specific characteristics.

Another business application applies to the use case when an employee retires/separates from a company. Upon retirement/separation, an employee can choose who inherits their business social assets and can indicate which assets would be inheritable and by whom.

One specific example of such business social assets inheritance is a status post example. In this example, a first user creates a status post that references a second user. Over time, the first user may want to give control of that status post to the person referenced (e.g., when the first user is no longer concerned about when the status post is removed from the social software system). On the other hand, after the first user has ensured that key people in the first user's network have seen the post, allowing the referenced person to inherit the post and make the determination of when the post may be removed (as well as if comments on the post should be deleted) can be advantageous (as compared, for example, to a conventional technique where only the poster has complete control over the post and comments made on it).

Another specific example of such business social asset inheritance is an example that includes documents, wikis, blogs, etc. In this example, after a protégé or junior colleague has exhibited "X" amount of proficiency in the topic related to the document, the system may begin the transition process of ownership to either "shared" or completely move ownership over to the junior colleague depending on the original owner's desires.

As described herein, mechanisms may provide a recommendation for transferring ownership of all or a subset of social network information (e.g., based on one or more criterion).

For example, given the historical sharing/inheritance history of content, an embodiment may suggest when an inheritance setup should be created (e.g., based upon actions that a user has and/or has not performed in the system). In one specific example, a junior colleague is doing all the work on a document, the original owner has not accessed the document in over a year, and the original owner has switched to a team that deals with different subject matter. In the past when this has happened, the original owner or people similar to the original owner may have created an inheritance transition. Therefore, the system may suggest such an inheritance transition.

In another example, an original owner knows specific criteria that should be exhibited in determining who takes over content in the social system and/or how the transition should occur. The following is one specific example of such a scenario: The inheriting person must have interacted with "Y" number of people regarding topic "Z". In this example, based upon these characteristics, the system will allow inheriting of content from the original owner to the inheriting person.

As described herein, content owners and/or delegates may define trigger events to invoke content inheritance. In one example, the content remains associated with the owner but access is also granted to the inheritor(s). In another example, content is inherited for only a period of time. In another example, both owner and delegate may perform upkeep actions on the content. Another example is where the content is completely removed from the originator's account and associated completely and solely with the "heir's" account (in one specific example, an optional reference to the originator's account may be available).

As mentioned, the present disclosure relates generally to the field of inheriting social network information. In one specific example, the inherited social network information may comprise ancestral social network information. In another specific example, the inherited social network information may comprise social network content and/or one or more social network profiles. In various other examples, inheriting social network information may be implemented in the form of systems, methods and/or algorithms.

In another embodiment, the inheritance mechanisms described herein may cover groups based on intersection of interests. For example, allow people who have a list of specific characteristic(s) to be eligible for inheriting content (and/or to actually inherit the content).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for enabling the inheritance of social network information from a first social networking contact to a second social networking contact, the method comprising:
   receiving, by a processor comprising hardware, an identification of the first social networking contact;
   obtaining, by the processor, an identification of the social network information;
   receiving, by the processor, at least one criterion defining a condition under which the second social networking contact is to be enabled to inherit the social network information;
   monitoring, by the processor, to determine that the at least one criterion has been met; and
   notifying the second social networking contact by the processor, after the determination that the at least one criterion has been met and after an identification of the second social networking contact has been made, that the second social networking contact is eligible to inherit the social network information;
   wherein the at least one criterion comprises at least one of: (a) the second social networking contact has reached a certain age; and (b) a specific date has passed; and
   wherein the notification of the second social networking contact that the second social networking contact is eligible to inherit the social network information is triggered by the determination that the at least one criterion has been met.

2. The method of claim 1, wherein the social network information comprises: (a) one or more social network profiles; (b) social network content; or (c) any combination thereof.

3. The method of claim 2, wherein the one or more social network profiles comprises: (a) one or more authorizations; (b) one or more access rights; (c) one or more rules; (d) one or more control rights; or (e) any combination thereof.

4. The method of claim 2, wherein the social network content comprises: (a) one or more contacts; (b) one or more documents; (c) one or more videos; (d) one or more pictures; (e) one or more files; (f) one or more posts; (g) one or more blogs; or (h) any combination thereof.

5. The method of claim 1, further comprising receiving by the processor an identification of the second social networking contact.

6. The method of claim 1, wherein the second social networking contact comprises: (a) a business associate of the first social networking contact; (b) a family member related to the first social networking contact; (c) a manager of the first social networking contact; (d) a delegate of first social networking contact; (e) a protégé of first social networking contact; (f) a colleague of first social networking contact; (g) a person matching one or more specified characteristics; or (h) any combination thereof.

7. The method of claim 1, wherein the inheritance comprises: (a) sharing the social network information between the first social networking contact and the second social networking contact; (b) delegating the social network information from the first social networking contact to the second social networking contact; or (c) any combination thereof.

8. The method of claim 1, wherein the inheritance comprises transferring the social network information from the first social networking contact to the second social networking contact.

9. A computer readable storage medium, tangibly embodying a program of instructions executable by the computer for enabling the inheritance of social network information from a first social networking contact to a second social networking contact, the program of instructions, when executing, performing the following steps:
   receiving an identification of the first social networking contact;
   obtaining an identification of the social network information;
   receiving at least one criterion defining a condition under which the second social networking contact is to be enabled to inherit the social network information;
   monitoring to determine that the at least one criterion has been met; and
   notifying the second social networking contact, after the determination that the at least one criterion has been met and after an identification of the second social networking contact has been made, that the second social networking contact is eligible to inherit the social network information;
   wherein the at least one criterion comprises at least one of: (a) the second social networking contact has reached a certain age; and (b) a specific date has passed; and
   wherein the notification of the second social networking contact that the second social networking contact is eligible to inherit the social network information is triggered by the determination that the at least one criterion has been met.

10. The computer readable storage medium of claim 9, wherein the social network information comprises: (a) one or more social network profiles; (b) social network content; or (c) any combination thereof.

11. The computer readable storage medium of claim 10, wherein the one or more social network profiles comprises: (a) one or more authorizations; (b) one or more access rights; (c) one or more rules; (d) one or more control rights; or (e) any combination thereof.

12. The computer readable storage medium of claim 10, wherein the social network content comprises: (a) one or more contacts; (b) one or more documents; (c) one or more videos; (d) one or more pictures; (e) one or more files; (f) one or more posts; (g) one or more blogs; or (h) any combination thereof.

13. The computer readable storage medium of claim 9, wherein the program of instructions, when executing, further performs receiving an identification of the second social networking contact.

14. The computer readable storage medium of claim 9, wherein the second social networking contact comprises: (a) a business associate of the first social networking contact; (b) a family member related to the first social networking contact; (c) a manager of the first social networking contact; (d) a delegate of first social networking contact; (e) a protégé of first social networking contact; (f) a colleague of first social networking contact; (g) a person matching one or more specified characteristics; or (h) any combination thereof.

15. The computer readable storage medium of claim 9, wherein the inheritance comprises: (a) sharing the social network information between the first social networking contact and the second social networking contact; (b) delegating the social network information from the first social networking contact to the second social networking contact; or (c) any combination thereof.

16. The computer readable storage medium of claim 9, wherein the inheritance comprises transferring the social network information from the first social networking contact to the second social networking contact.

17. A computer-implemented system for enabling the inheritance of social network information from a first social networking contact to a second social networking contact, the system comprising:
- a processor comprising hardware; and
- a memory storing computer readable instructions that, when executed by the processor, implement:
- receiving an identification of the first social networking contact;
- obtaining an identification of the social network information;
- receiving at least one criterion defining a condition under which the second social networking contact is to be enabled to inherit the social network information;
- monitoring to determine that the at least one criterion has been met; and
- notifying the second social networking contact, after the determination that the at least one criterion has been met and after an identification of the second social networking contact has been made, that the second social networking contact is eligible to inherit the social network information;
- wherein the at least one criterion comprises at least one of: (a) the second social networking contact has reached a certain age; and (b) a specific date has passed; and
- wherein the notification of the second social networking contact that the second social networking contact is eligible to inherit the social network information is triggered by the determination that the at least one criterion has been met.

18. The system of claim 17, wherein the social network information comprises: (a) one or more social network profiles; (b) social network content; or (c) any combination thereof.

19. The system of claim 18, wherein the one or more social network profiles comprises: (a) one or more authorizations; (b) one or more access rights; (c) one or more rules; (d) one or more control rights; or (e) any combination thereof.

20. The system of claim 18, wherein the social network content comprises: (a) one or more contacts; (b) one or more documents; (c) one or more videos; (d) one or more pictures; (e) one or more files; (f) one or more posts; (g) one or more blogs; or (h) any combination thereof.

* * * * *